UNITED STATES PATENT OFFICE.

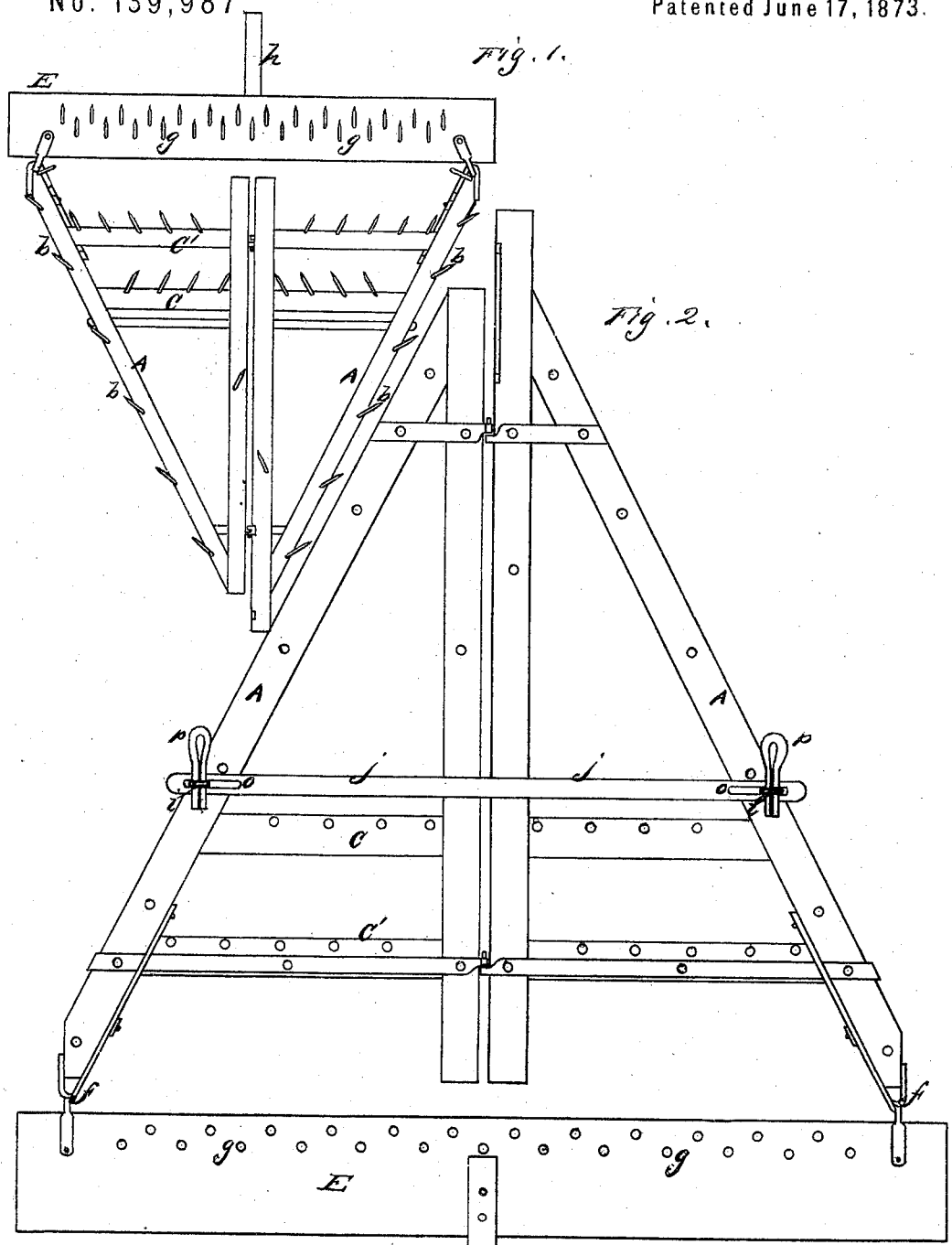

PARMENAS N. WOODWORTH, OF STONY POINT, CALIFORNIA.

IMPROVEMENT IN HARROWS.

Specification forming part of Letters Patent No. 139,987, dated June 17, 1873; application filed April 7, 1873.

*To all whom it may concern:*

Be it known that I, PARMENAS N. WOODWORTH, of Stony Point, Sonoma county, State of California, have invented an Improved Harrow; and I do hereby declare the following description and accompanying drawings are sufficient to enable any person skilled in the art or science to which it most nearly appertains to make and use my said invention or improvement without further invention or experiment.

My invention relates to an improved harrow for pulverizing the soil in order to render it fit for cultivation.

In order to properly explain my invention, reference is had to the accompanying drawings, forming a part of this specification, in which—

Figure 1 is a bottom view of my harrow. Fig. 2 is a top view.

A A represent two triangular frames, which are united together so as to form a double V-shaped harrow similar to the ordinary field-harrow. The teeth *b b* on the outside angular timbers of the harrow-frame are set outward and backward, as shown, so as to give a drawing and outward drag to the teeth, while the teeth on the middle timbers rake directly backward.

The teeth on the cross-timbers C C' of each section of the harrow have an oblique backward slant, as shown, those of the forward timber C being slanted in an opposite direction from those on the timber C', thus giving a series of gangs of teeth slanting in various directions. Usually I shall slant the teeth on the cross-timbers C C' of the two sections of the harrow in opposite directions. To the rear ends of the angular timbers of the frames A A of the harrow I attach the opposite ends of a wide board, E, by means of links *f*, so as to provide a transverse dray in the rear of the harrow. To the under side of this transverse drag I secure one or more rows or series of teeth, *g g*, which slant backward. A lever, *h*, is secured to the middle of the drag E, which extends to the rear so that it can be grasped by the person attending the harrow and pressed downward with sufficient force to sink the teeth into the ground, as required by the varying character of the soil.

In order to prevent the two sections of the harrow from jumping or buckling upward upon the hinges where they are joined together in the middle, I secure upon each of the outside angular timbers of the frames A, at some point near their middles, a vertical post, *i*, in which are several holes, as shown. A bar, *j*, which is provided with a slot, *o*, at each end is placed transversely across so that the upright post *i* will pass up through the slots. A key, *p*, is then placed in one of the holes in the post to prevent the bar from coming off. This bar will prevent this upward buckling of the middle of the harrow when a clod attempts to pass under it, but will not interfere with the lifting of the rear corners of the harrow, which is necessary at times to prevent the teeth from choking with weeds, as the slots will allow the post *i* to move back and forth, so that the outer timbers A can be lifted sufficiently to clear the teeth.

By moving the pins up or down in the holes the harrow can be allowed more or less movement, as desired.

By this means I provide a harrow which is provided with teeth standing in various directions, so as to insure the proper pulverization of the ground over which it passes.

Having thus described my invention, what I claim, and desire to secure by Letters Patent, is—

A harrow in which the teeth on the outside timbers of the frames A A slant outward and backward, while those on the middle longitudinal timbers slant backward only, in combination with the obliquely and backward slanting teeth on the cross timbers C C', slanting in opposite directions, substantially as and for the purpose above described.

In witness whereof I hereunto set my hand and seal.

PARMENAS N. WOODWORTH. [L. S.]

Witnesses:
JOHN L. BOONE,
C. M. RICHARDSON.